United States Patent Office 3,647,836
Patented Mar. 7, 1972

3,647,836
N-BROMO-N-CHLORO-SULFAMYL BENZOIC
ACIDS AND SALTS THEREOF
Laurence O. Paterson, Adrian, Mich., assignor to
Drug Research, Inc., Adrian, Mich.
No Drawing. Application Aug. 24, 1965, Ser. No. 482,256,
which is a continuation-in-part of applications Ser. No.
119,756, Apr. 7, 1961, Ser. No. 143,565, Oct. 9, 1961,
Ser. No. 593,047, June 22, 1956, now Patent No.
3,147,259, Ser. No. 126,403, June 14, 1961, now Patent
No. 3,147,219, and Ser. No. 674,362, May 22, 1967.
Divided and this application June 17, 1970, Ser. No.
47,121
Int. Cl. C07f 7/22, 3/02, 3/04
U.S. Cl. 260—429.7                                    13 Claims

ABSTRACT OF THE DISCLOSURE

N-bromo-N-chloro-sulfamyl benzoic acids are provided having the formula:

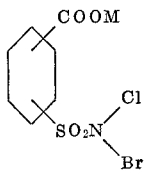

in which M is hydrogen or a metallic cation. These compounds have biocidal and disinfectant properties.

---

This application is a continuation-in-part of Ser. No. 119,756, filed Apr. 7, 1961, now abandoned, Ser. No. 143,565, filed Oct. 9, 1961, now abandoned, Ser. No. 593,047, filed June 22, 1956, now U.S. Pat. No. 3,147,259, Ser. No. 126,403, filed June 14, 1961, now U.S. Pat. No. 3,147,219, Ser. No. 674,362, filed May 22, 1967, now abandoned, and a division of Ser. No. 482,256, filed Aug. 24, 1965, now abandoned.

Sulfamly benzoic acid, also known as carboxy benzene sulfonamide, has one sulfonamide group. The two N-hydrogen atoms of such sulfonamides are reactive with the halogens, bromine and chlorine to permit the formation of stable N-bromo-N-chloro-sulfamyl benzoic acids and salts thereof. The carboxylic acid radical may react with inorganic cations, to provide a variety of useful salts.

The aromatic sulfonamides in accordance with the invention accordingly are sulfonamides of benzene, having one carboxylic acid radical, and one sulfonamide radical, and the nitrogen atom of the sulfonamide radical is substituted both by bromine and by chlorine. These compounds have the formula:

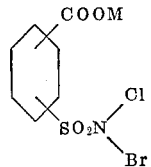

wherein M is selected from hydrogen, an alkali metal cation, such as lithium, sodium or potassium, an alkaline earth metal cation, such as calcium, magnesium or barium, or other inorganic metallic cations such as zinc, iron, chromium, aluminum, tetravalent tin, and cupric copper.

The carboxylic acid radical and the sulfonamide radical can be in any position on the ring relative to each other, ortho, meta, or para. All three isomers display enhanced biocidal properties, because of the presence of chlorine and bromine on the same nitrogen atom. The ortho and para derivatives are more readily prepared, and are preferred, These compounds accordingly find application as bactericides, fungicides, algicides, and also as valuable reagents in chemical synthesis.

Representative compounds falling within the invention are as follows:

o-, m- and p-N-chloro-N-bromo-sulfamyl benzoic acid,
o-, m- and p-sodium-N-chloro-N-bromo-sulfamyl benzoate,
o-, m- and p-lithium-N-chloro-N-bromo-sulfamyl benzoate,
o-, m- and p-potassium-N-chloro-N-bromo-sulfamyl benzoate,
o-, m- and p-calcium-N-chloro-N-bromo-sulfamyl benzoate,
o-, m- and p-zinc-N-chloro-N-bromo-sulfamyl benzoate,
o-, m- and p-magnesium-N-chloro-N-bromo-sulfamyl benzoate,
o-, m-, and p-cupric-N-chloro-N-bromo-sulfamyl benzoate,
o-, m- and p-aluminum-N-chloro-N-bromo-sulfamyl benzoate,
o-, m-, and p-iron-N-chloro-N-bromo-sulfamyl benzoate.
o-, m- and p-chromium-N-chloro-N-bromo-sulfamyl benzoate, and
o-, m- and p-stannic-N-chloro-N-bromo-sulfamyl benzoate.

These compounds can be prepared by reacting the sulfamyl benzoic acid or salt with bromine in an aqueous alkaline medium to produce a mixture of the N-monobromo compound and the starting material, and then reacting this mixture with chlorine to form the N-bromo-N-chloro compound. Alternatively, the N-bromo-N-chloro-derivative can be prepared by reacting an N-dichlorosulfamyl benzoic acid with the appropriate amount of a bromide, such as an alkali metal bromide, such as sodium bromide, or by admixing an N-dibromo-N-sulfamyl benzoic acid or salt and an N-dichloro-N-sulfamyl benzoic acid or salt to effect a halogen interchange, either as a dry powder mix or in aqueous slurry form. It is also possible to react an N-sulfamyl benzoic acid with bromine and chlorine simultaneously, to form the N-bromo-N-chloro-compound.

The resulting N-bromo-N-chlorosulfamyl benzoic acid can be isolated as the acid. If the salt is desired, the cation of the desired salt is provided in the reaction mixture. Stoichiometric amounts of the halogens are employed. With certain of the metallic cations complex hydrates of the holigenated sulfamyl benzoate result.

The reaction is preferably carried out in an aqueous alkaline medium in which the sulfamyl benzoic acid or salt thereof is substantially soluble. At the conclusion of the reaction, the reaction product can be separated from the reaction mixture by filtration or by centrifuging. However, although the compounds of the invention, even the alkali metal salts, are relatively insoluble in water, or at least sufficiently insoluble so that they can be isolated in this way from the reaction mixture, they are nonetheless sufficiently soluble to provide good biocidal properties to water and aqueous systems.

The following examples in the opinion of the inventor represent preferred embodiments of the invention.

EXAMPLE 1

Twenty-seven grams (0.1 mole) of finely ground p-(N,N-dichlorosulfamyl)benzoic acid was suspended in 500 ml. of water containing 10.3 grams (0.1 mole) of sodium bromide. Agitation was continued until the bromine had been taken up, as indicated by the loss of bromine color from the water. The product was removed on a filter, washed and dried. It consisted essentially of p-(N-bromo - N - chloro - sulfamyl)benzoic acid containing 51.3% active halogen, calculated as bromine. A saturated solution of the resulting compound provided a bromine equivalent of 44 mg./l. of active halogen.

EXAMPLE 2

20.1 grams (0.1 equivalent) of p-sulfamyl benzoic acid was dissolved in 500 ml. of water containing 10.6 grams (0.2 equivalent) of sodium carbonate. The solution was cooled to 15° C. and 8 grams (0.1 equivalent) of bromine were added dropwise to the stirred mixture. When all of the bromine had been taken up, gaseous chlorine was introduced to a final pH of 5.8. The resulting product was white in color. It was filtered off and dried. Upon analysis the compound was found to contain 25.2% bromine and 11.6% chlorine, corresponding to p-(N-bromo-N-chloro-sulfamyl)benzoic acid.

EXAMPLE 3

Forty-eight grams of finely ground sodium p-(N,N-dichlorosulfamyl)benzoate (Halazone) was suspended in 500 ml. of water containing 10.3 grams of sodium bromide. Agitation was continued until the bromide had reacted, as indicated by loss of bromine color from the water. The product was removed by filtration and dried. It consisted essentially of sodium p-(N-bromo-N-chlorosulfamyl) benzoate, containing 23.6% bromine and 10.5% chlorine, by analysis.

EXAMPLE 4

Twenty and one-tenth grams of p-sulfamyl benzoic acid was dissolved in 500 grams of water containing 7.2 grams of lithium hydroxide and 10.4 grams of monohydrate of lithium bromide. The temperature of the solution was lowered to 15° C., and chlorine gas was added to a pH of 5.8. Lithium p-(N-bromo-N-chloro-sulfamyl) benzoate was filtered off and dried. It contained 48.3% active halogen, calculated as bromine.

EXAMPLE 5

Twenty and one-tenth grams of p-sulfamyl benzoic acid was dissolved in 500 grams of water containing 16.8 grams of potassium hydroxide. This solution was cooled to 15° C., and 8 grams of bromine added, with stirring, followed by 10.6 grams of gaseous chlorine to complete the reaction. The resultant potassium p-(N-bromo-N-chloro-sulfamyl)benzoate was filtered off and dried. It was found to analyze 22.1% bromine and 10% chlorine.

EXAMPLE 6

Thirty-five and nine-tenths grams (0.1 mole) of finely ground p-(N,N-dibromo-sulfamyl)benzoic acid and 26.9 grams (0.1 mole) of p-(N,N-dichloro-sulfamyl)benzoic acid were suspended in water containing 200 grams of aluminum hydroxide gel (2% as aluminum).

The mixture was stirred thoroughly to allow reaction of the various components. The product was then separated by filtration and 65 grams of aluminum p-(N-bromo-N-chloro-sulfamyl)benzoate obtained.

The reaction can also be carried out by reacting the solid p-(N,N-dibromo-sulfamyl)benzoic acid and p-(N,N-dichloro-sulfamyl)benzoic acid with dried aluminum hydroxide gel to form aluminum p-(N-bromo-N-chloro-sulfamyl) benzoate.

EXAMPLE 7

Six and one-half grams (0.05 mol) of elemental zinc were dissolved in 40 grams of 20% sodium hydroxide solution. This solution was cooled to 15° C. and added dropwise to a stirred suspension of 20.1 grams (0.1 mol) of p-sulfamyl benzoic acid in 500 ml. of water, simultaneously with 8 grams of liquid bromine. The resultant suspension was treated with gaseous chlorine to a pH of 6.0 The product was removed on a filter, washed and dried. It consisted essentially of a hydrate of zinc p-(N-bromo - N - chloro-sulfamyl)benzoate, containing 18% bromine and 9.2% chlorine.

EXAMPLE 8

Ten and three-tenths grams of sodium bromide, 5.3 grams of sodium carbonate and 20.1 grams of p-sulfamyl benzoic acid were stirred in 300 grams of water to obtain substantial solution of the sulfamyl benzoic acid. To this mixture was added magnesium carbonate containing an equivalent of 1.3 grams of magnesium. With continued stirring, chlorine gas was added to a pH of 5.8. The resultant precipitate contained magnesium p-(N-bromo-N-chloro-sulfamyl)benzoate. It was filtered off, dried and analyzed for active halogen, and upon analysis was found to contain 45% active halogen calculated as bromine.

EXAMPLE 9

Twenty and one-tenth grams of p-sulfamyl benzoic acid, 11.7 grams of calcium hydroxide and 10.3 grams of sodium bromide were stirred in 500 ml. of water to accomplish substantial solution. Chlorine gas was added to the resultant mixture until the pH reached 5.5. Calcium p-(N-bromo - N - chloro - sulfamyl)benzoate was filtered off and dried. It was white in color, containing both active bromine and chlorine.

EXAMPLE 10

Twenty-seven grams of sodium stannate and 10.3 grams of sodium bromide were dissolved in water. To this was added 20.1 grams of p-sulfamyl benzoic acid. With stirring, gaseous chlorine was added to a pH of 5.8. The resultant stannic p - (N - bromo - N - chloro)benzoate was filtered off and dried.

EXAMPLE 11

To a freshly-prepared suspension of copper hydroxide containing 5.0 grams of cupric hydroxide (65% copper) in 500 ml. of water was added 20.1 grams of p-sulfamyl benzoic acid, 10.6 grams of sodium carbonate and 10.3 grams of sodium bromide. This mixture was treated with gaseous chlorine to a pH of 5.5. The resultant copper salt was removed on a filter and dried. It contained 40.6% of active halogen, calculated as bromine.

This salt has particular merit in disinfecting areas where enhanced fungicidal properties are required.

EXAMPLE 12

To a freshly-prepared suspension of ferric hydroxide containing an equivalent of 2.8 grams iron in 500 ml. of water was added 20.1 grams of p-sulfamyl benzoic acid, 10.6 grams of sodium carbonate and 10.3 grams of sodium bromide. This mixture was treated with gaseous chlorine to a pH of 5.5. The tan precipitate was removed on a filter and dried. It contained 40.8% of active halogen, calculated as bromine, and consisted substantially of ferric p-(N-bromo-N-chlorosulfamyl) benzoate.

The N-chloro-N-bromo-sulfamyl benzoic acids and salts thereof in accordance with the invention have special merit as biocidal agents because of the presence of both the bromine and chlorine. These compounds have superior bactericidal properties to the N-dichloro compounds of the prior art, such as Halazone, which tends to bind the chlorine even in water. The p-(N-bromo-N-chlorosulfamyl)benzoic acid and benzoates not only release the active bromine rapidly in the water, but quite unexpectedly, the chlorine also assumes a free or active form.

This is evidenced by a comparison of the bactericidal properties of various all-N-chloro compounds of the type of Halazone and the corresponding N-bromo-N-chloro derivatives.

The rate of release of active halogen was evaluated for a group of eight compounds, all aromatic sulfonamides, against *Escherichia coli*, employing the methodology and operating technique described in Official Methods of Analysis of the Association of Official Agricultural Chemists, tenth edition, 1965, page 90, sections 5.036 to 5.044, inclusive. The compounds tested and the test results obtained are shown in Table I below:

TABLE 1

| Available chlorine or bromine derived from | Available halogen in p.p.m. | pH | Escherichia coli count per ml. test $H_2O$ after exposure time of— | |
|---|---|---|---|---|
| | | | 0 min. | 2 min. |
| 1. N-dichloro-benzenesulfonamide (dichloro analogue of Chloramine B) | 2.8 | 7.2 | $1.26 \times 10^6$ | 24,000 |
| 2. N-bromochloro-benzenesulfonamide | 2.3 | 7.2 | $1.26 \times 10^6$ | 25 |
| 3. N-dichloro-N'-dichloro-benzenedisulfonamide | 2.7 | 7.2 | $1.30 \times 10^6$ | 70,000 |
| 4. N-dichloro-toluenesulfonamide (Dichloramine-T) | 2.4 | 7.2 | $1.30 \times 10^6$ | 45,000 |
| 5. N-bromochloro-N'-bromochloro-benzenedisulfonamide | 2.0 | 7.2 | $1.30 \times 10^6$ | 126 |
| 6. N-bromochloro-N'-dichloro-benzenedisulfonamide | 2.0 | 7.2 | $1.30 \times 10^6$ | 135 |
| 7. p-(N-dichloro-sulfamyl)benzoic acid | 2.8 | 7.2 | $1.26 \times 10^6$ | 20,800 |
| 8. p-(N-bromo-N-chloro-sulfamyl) benzoic acid | 2.5 | 7.2 | $1.26 \times 10^6$ | 0 |

It is evident from the above data that the rate of release of active halogen from the N-bromo-chloro compounds 2, 5, 6 and 8 was considerably greater than the rate of release of active chlorine from the N-dichloro derivatives 1, 3, 4 and 7. In all cases, the N-chloro-N-bromo compounds showed an excellent bactericidal activity in the two minutes' test time, whereas the N-dichloro compounds did not. The N-bromo-N-chloro compounds gave almost complete control of *Escherichia coli* within the two minutes, whereas the N-dichloro compounds did not.

p-(N-bromo-N-chloro-sulfamyl)benzoic acid has a low solubility in water, providing 44 p.p.m. of active halogen at saturation. This makes possible a process for the continuous disinfection of water by the simple process of passing water over tablets or briquettes of the compound, such as on top of a filter incorporated in a pumping line to a swimming pool. Free chlorine and bromine in such water is limited to the saturation solubility of the compound.

The various metal salts have varying solubility. The alkali metal salts, sodium, lithium and potassium, have relatively good solubility in water, and are suited for the preparation of tablets where single dosage treatment of small quantities of water is desired, such as, for example, canteen water. Alternatively, p-(N-bromo-N-chlorosulfamyl)benzoic acids may be tableted with a mildly alkaline salt, such as sodium benzoate or sodium borate, to provide enhanced solubility for the tablets.

The alkaline earth metal salts and the other metal salts referred to above have a lower solubility in water, comparable to that of the N-chloro-N-bromo-sulfamyl benzoic acid, and are suitable for the production of tablets or briquettes in the continuous disinfection of water, such as for swimming pools. Certain of the metallic cations as released may provide additional water-treating functions such as iron and aluminum hydrates in the cationic precipitation of suspended matter. Cupric ion provides enhancing fungicidal activity.

Having regard to the foregoing disclosure, the following is claimed as the inventive and patentable embodiments thereof:

1. N-chloro-N-bromo-sulfamyl benzoic acids and salts thereof having the formula:

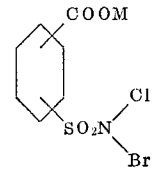

wherein M is selected from hydrogen, alkali metals, alkaline earth metals, iron, aluminum, zinc, magnesium, chromium, stannic tin and copper.

2. An N-chloro-N-bromo-sulfamyl benzoic acid in accordance with claim 1, wherein M is hydrogen.

3. An N-chloro-N-bromo-sulfamyl benzoic acid salt in accordance with claim 1, wherein M is an alkali metal.

4. An N-chloro-N-bromo-sulfamyl benzoic acid salt in accordance with claim 3, wherein M is sodium.

5. An N-chloro-N-bromo-sulfamyl benzoic acid salt in accordance with claim 3, wherein M is potassium.

6. An N-chloro-N-bromo-sulfamyl benzoic acid salt in accordance with claim 3, wherein M is lithium.

7. An N-chloro-N-bromo-sulfamyl benzoic acid salt in accordance with claim 1, wherein M is an alkaline earth metal.

8. An N-chloro-N-bromo-sulfamyl benzoic acid salt in accordance with claim 7, wherein M is calcium.

9. An N-chloro-N-bromo-sulfamyl benzoic acid salt in accordance with claim 1, wherein M is tin.

10. An N-chloro-N-bromo-sulfamyl benzoic acid salt in accordance with claim 1, wherein M is aluminum.

11. An N-chloro-N-bromo-sulfamyl benzoic acid salt in accordance with claim 1, wherein M is copper.

12. An N-chloro-N-bromo-sulfamyl benzoic acid salt in accordance with claim 1, wherein M is zinc.

13. An N-chloro-N-bromo-sulfamyl benzoic acid salt in accordance with claim 1, wherein M is iron.

References Cited

UNITED STATES PATENTS

| 2,171,901 | 9/1939 | Wilson et al. | 260—556 |
| 2,495,489 | 1/1950 | Van Ardell | 260—556 |

TOBIAS E. LEVOW, Primary Examiner

F. W. BELLAMY, Assistant Examiner

U.S. Cl. X.R.

260—448, 429.9, 439, 438.1 516, 518; 424—288, 289, 294, 295, 317, 321

PO-1050
(5/69)

UNITED STATES PATENT OFFICE
CERTIFICATE OF CORRECTION

Patent No. 3,647,836      Dated March 7, 1972

Inventor(s) LAURENE O. PATERSON

It is certified that error appears in the above-identified patent and that said Letters Patent are hereby corrected as shown below:

Column 1, line 4 - Heading: "Laurence" should be -- Laurene --

Column 1, line 41 : "Sulfamly" should be -- Sulfamyl --

Column 2, line 47 : "holigenated" should be -- halogenated --

Signed and sealed this 13th day of February 1973.

(SEAL)
Attest:

EDWARD M. FLETCHER, JR.
Attesting Officer

ROBERT GOTTSCHALK
Commissioner of Patents